(12) United States Patent
Ladstätter et al.

(10) Patent No.: US 12,176,662 B2
(45) Date of Patent: Dec. 24, 2024

(54) CARRIER RAIL, AND CARRIER RAIL SYSTEM HAVING CARRIER RAILS

(71) Applicant: ZUMTOBEL LIGHTING GMBH, Dornbirn (AT)

(72) Inventors: Gerald Ladstätter, Klaus (AT); Andreas Machate, Wangen im Allgäu (DE)

(73) Assignee: Zumtobel Lighting GmbH, Dornbirn (AT)

( * ) Notice: Subject to any disclaimer, the term of this patent is extended or adjusted under 35 U.S.C. 154(b) by 27 days.

(21) Appl. No.: 17/766,855

(22) PCT Filed: Oct. 1, 2020

(86) PCT No.: PCT/EP2020/077509
§ 371 (c)(1),
(2) Date: Apr. 6, 2022

(87) PCT Pub. No.: WO2021/069300
PCT Pub. Date: Apr. 15, 2021

(65) Prior Publication Data
US 2024/0072501 A1 Feb. 29, 2024

(30) Foreign Application Priority Data
Oct. 8, 2019 (DE) ...................... 10 2019 126 915.6

(51) Int. Cl.
*H01R 25/16* (2006.01)
*F21V 21/34* (2006.01)

(52) U.S. Cl.
CPC ........... *H01R 25/162* (2013.01); *F21V 21/34* (2013.01)

(58) Field of Classification Search
CPC ...... F21V 21/34; H01R 25/162; H01R 25/142
See application file for complete search history.

(56) References Cited

U.S. PATENT DOCUMENTS 4,118,760 A * 10/1978 Cohon .................... F21S 8/033
362/258
5,306,165 A * 4/1994 Nadeau .................. H01R 25/14
439/115
(Continued)

FOREIGN PATENT DOCUMENTS

CN 204885742 12/2015
DE 4300402 A1 * 7/1994 .............. F21V 21/35
(Continued)

OTHER PUBLICATIONS

DE102004009705 original w/ translation (Year: 2004).*
(Continued)

*Primary Examiner* — Marcus E Harcum
(74) *Attorney, Agent, or Firm* — Andrus Intellectual Property Law, LLP (57) ABSTRACT

The present invention relates to a carrier rail (1) for a carrier rail system, comprising: an elongate carrier profile (2); a busbar (4) having at least one electrical conductor (40) for electrically connecting electrical or electronic components (3), wherein the busbar (4) extends along the carrier profile (2); and an adapter element (5) having a first connection (6) and a connecting element (8) and also an adapter housing (9) for carrying the first connection (6) and/or the connecting element (8), wherein the first connection (6) can be coupled electrically and/or by means of signals to the busbar (4) via the connecting element (8), and wherein the first connection (6) is configured for connecting a corresponding second connection (70) of an electrical or electronic component (7) such that the electrical or electronic component (7) can be coupled electrically and/or by means of signals to the busbar (4) via the connecting element (8). The invention also relates to a carrier rail system that comprises the carrier rail according to the invention.

23 Claims, 6 Drawing Sheets

(56) References Cited

U.S. PATENT DOCUMENTS

| | | | | |
|---|---|---|---|---|
| 5,603,621 | A * | 2/1997 | Elmouchi | H01R 25/142 |
| | | | | 439/119 |
| 5,886,295 | A * | 3/1999 | Carino | H02G 3/288 |
| | | | | 52/239 |
| 6,663,435 | B2 * | 12/2003 | Lincoln, III | H01R 25/003 |
| | | | | 439/115 |
| 7,614,896 | B2 * | 11/2009 | Johnson | H02G 3/00 |
| | | | | 439/120 |
| 8,217,266 | B2 * | 7/2012 | Caveney | H02G 3/105 |
| | | | | 174/72 A |
| 9,722,372 | B2 * | 8/2017 | Byrne | H01R 25/164 |
| 10,483,687 | B2 * | 11/2019 | Yamashita | H02G 3/088 |
| 10,658,804 | B2 * | 5/2020 | Tsukamoto | H01R 4/48185 |
| 11,081,815 | B2 * | 8/2021 | Byrne | G06F 13/38 |
| 11,201,002 | B2 * | 12/2021 | Ware | H01B 9/003 |
| 2015/0079824 | A1 * | 3/2015 | Dinnebier | H01R 13/44 |
| | | | | 439/121 |
| 2018/0076586 | A1 * | 3/2018 | Rangi | H01R 13/639 |
| 2019/0296507 | A1 | 9/2019 | Fukami et al. | |

FOREIGN PATENT DOCUMENTS

| | | |
|---|---|---|
| DE | 202018102643 U1 * | 9/2019 |
| EP | 2287978 | 2/2011 |
| FR | 1551204 | 12/1968 |
| JP | 2009100039 | 5/2009 |
| JP | 2016015809 | 1/2016 |

OTHER PUBLICATIONS

PCT/EP2020/077509, International Search Report and Written Opinion dated Jan. 12, 2021, 14 pages and English translation, 6 pages.

\* cited by examiner

CARRIER RAIL, AND CARRIER RAIL SYSTEM HAVING CARRIER RAILS

CROSS-REFERENCE TO RELATED APPLICATION

The present application is the U.S. national stage application of international application PCT/EP2020/077509 filed Oct. 1, 2020, which international application was published on Apr. 15, 2021 as International Publication WO 2021/069300 A1. The international application claims priority to German Patent Application 10 2019 126 915.6, filed Oct. 8, 2019.

FIELD OF THE INVENTION

The present invention relates to a carrier rail for a carrier rail system with an elongate carrier profile and to a busbar with at least one electrical conductor, said busbar extending along the carrier profile. Furthermore, the invention also relates to a carrier rail system comprising a plurality of such carrier rails.

BACKGROUND OF THE INVENTION

Carrier rails of the aforementioned type are basically known from the prior art. They are generally used to receive and supply electrical and electronic components, such as lamps and light band components. Further electrical or electronic components, such as speakers or sensors, and the like can also be received in corresponding carrier rails or carrier profiles. The Internet of Things (IoT) increasingly brings new opportunities for use for a variety of additional elements, such as the use of beacons, sensors of all kinds, and so forth.

The increasing use of electrical or electronic components on such carrier rails ensures that these carrier rails are heavily loaded with corresponding components so that they are often in one another's way or a functional collision can occur. A frequent function of such carrier rails, namely receiving lamps for light output, is also increasingly limited by the use of further electrical and electronic components, such as IoT components, which often extend spatially into the light output area. Furthermore, corresponding electrical or electronic components utilize different interfaces so that a corresponding device must be individually configured depending on the components to be used. The provision of connection options for such components is thus not only complicated but also associated with high costs. The installation of corresponding interfaces is always associated with a great deal of effort in the case of the carrier rail systems known today.

Nevertheless, the use of electrical or electronic components is of great importance, in particular in combination with carrier rails. For example, a majority of the known IoT components is already equipped with wireless data transfer and therefore increasingly finds fields of application. However, these and other electrical and electronic components are still preferably supplied by means of cables or alternatively by means of accumulators.

SUMMARY OF THE INVENTION

It is thus an object of the present invention to provide a carrier rail as well as a carrier rail system comprising a plurality of carrier rails, which provide connection options for electrical or electronic components in a simple manner.

According to a first aspect, the present invention therefore relates to a carrier rail for a carrier rail system. The carrier rail has an elongate carrier profile. Furthermore, the carrier rail comprises a busbar with at least one electrical conductor for electrically connecting electrical or electronic components. The busbar extends along the carrier profile. The carrier rail furthermore comprises an adapter element. The adapter element in turn comprises at least one first connection and at least one connecting element as well as an adapter housing for carrying the first connection and/or the connecting element. The adapter housing may thus preferably comprise at least the first connection and/or the connecting element. The first connection can be connected electrically and/or by means of signals to the busbar via the connecting element. The first connection is configured for connecting a corresponding second connection of an electrical or electronic component in order to electrically and/or by means of signals couple the electrical or electronic component to the busbar via the connecting element.

By means of this adapter, it is thus made possible to easily provide a component via corresponding interfaces. Through the connecting element, a corresponding carrier profile equipped with a busbar can thus be retrofitted with such a component. The simple use of the voltage already provided via the busbar (preferably a low voltage) by means of the connecting element increases the practical application of a carrier rail according to the invention. It is thus possible by means of the adapter element to connect various (e.g., standardized) interfaces to the carrier rail at any time and independently of further electrical or electronic components, for example lamps, and thus also independently of a light level of the device. In this way, a provision, a simple connection as well as the supply of any additional electrical or electronic components can be ensured with less effort.

The first connection can preferably form a part of a standard interface, such as HDMI, USB, coaxial connector, network plug connector for a LAN cable for Power over Ethernet (PoE), for example. In particular, the first connection forms a standardized connection socket of a corresponding standard interface. In this way, all possible and in particular intelligent components can be supplied electrically and/or in terms of data via the busbar in a particularly simple manner.

The adapter element may comprise a plurality of first connections. The latter may be designed the same or differently. In this respect, a plurality of electrical or electronic components can also be connected directly. When different first connections are provided, it is also possible to use different interfaces and thus to also connect devices with different interfaces correspondingly easily.

One, several, or all of the (plurality of) first connections may in each case be couplable electrically and/or by means of signals to the busbar via one or more connecting elements. The adapter can thus be configured or designed specifically according to the given requirements.

A printed circuit board for transforming the voltage values and/or current values of the busbar, for example to that of the first connection(s) or of the components connected thereto, may be provided between the connecting element and the first connection(s). The printed circuit board may also be designed to transform from the first connection, such as an Ethernet input, to a third connection, such as an Ethernet output. The adapter housing particularly preferably also comprises this third connection. Consequently, a corresponding transformation of the voltage values and/or current values can be carried out in a simple manner as required for the respective connections. Power over Ethernet (PoE) can also be easily used.

The adapter housing may comprise the first connection and/or the third connection and preferably be integrally formed therewith. The handling of the adapter can thus be further improved and the adapter can also be designed in an optically appealing manner.

The carrier profile can comprise at least one through-opening. In order to couple electrically and/or by means of signals to the busbar, the connecting element can then be guided at least partially through the through-opening. In this way, defined connection positions may be provided. In addition, connection of the connecting element to the busbar is particularly easily possible.

The connecting element may be (directly) connectable/connected to the busbar for coupling electrically and/or by means of signals. In this way, the adapter element can be positioned in any manner and, if necessary, correspondingly retrofitted. It is also possible to easily replace or maintain corresponding adapter elements.

The connecting element can be formed directly on or with the adapter housing (integrally) in that it projects, for example as part of the adapter housing, with corresponding connecting regions. The connecting element may also be releasably connected to the adapter housing so that replacement or configuration with any connecting elements is facilitated.

It is also conceivable that the connecting element is connected electrically and/or by means of signals via a cable to the first connection. A connecting element designed in this way can be designed as a connecting plug connected by means of a cable, for example. The connecting element or its connection position is thus more flexible.

The connecting element may be designed with the first connection as a unit. This unit can be connectable/connected to the adapter housing, preferably via the connecting element and more preferably releasably. The adapter housing can thus be fitted with a correspondingly configured combination of first connection and connecting element so that the adapter housing can be easily equipped individually with a unit that is flexible with respect to the connection position.

Depending on the area of application, the connecting element can thus be designed or provided in different ways. An integral design with the adapter housing provides for easier connection of the adapter to the busbar. A cable solution allows for more flexible handling and more flexible connection options of the connecting element to the busbar.

The carrier profile can limit an internal space for at least partially receiving electrical or electronic components. These components can thus be safely received and preferably also connected via the busbar. Preferably, electrical contact areas provided for this purpose can be limited by the carrier profile on the one hand and a (functional) front side of the electrical or electronic components on the other hand, and can thus be arranged in a contact-safe manner.

The carrier profile can furthermore comprise a holding structure for mechanically fastening the carrier rail. The carrier profile can thus be mounted on a mounting surface in a simple manner, for example by direct assembly or by means of an additional component, such as a retaining spring.

The busbar may be received in or on the carrier profile. Preferably, the busbar is provided in the interior space of the carrier profile so that by inserting corresponding electrical or electronic components, establishing a corresponding contact electrically and/or by means of signals is easily possible.

The carrier profile can have an open longitudinal side via which the busbar can be accessible and the electrical or electronic components can preferably be electrically coupled to the busbar, and more preferably mechanically coupled to the carrier profile. This allows a particularly simple coupling of the mentioned electrical or electronic components, both electrically via the busbar and mechanically via the carrier profile.

The carrier rail may furthermore comprise an electrical or electronic component. The latter in turn has a second connection for connecting to the corresponding first connection of the adapter element for coupling electrically and/or by means of signals to the busbar. The electrical or electronic component may preferably be a lamp, in particular a spot lamp or a gooseneck lamp, a sensor, in particular a motion sensor or a brightness sensor, a beacon, a WLAN repeater, a speaker, a camera, a fan, and/or a fire detector. Naturally, the invention is not limited to any particular electrical or electronic component, as long as the latter is equipped with a corresponding second connection, with which this component can be coupled to the first connection. The possible applications of the carrier rail according to the invention are thus diverse, which significantly increases the flexibility of the carrier rail. This paired with a simple connection of corresponding components makes this carrier rail particularly user-friendly.

The electrical or electronic component may comprise a coupling region for mechanically coupling to the carrier profile and/or the busbar and/or the adapter element and preferably the adapter housing thereof. By providing a corresponding coupling region, the provision of the corresponding components can be further improved. These components can thus be positioned in a defined manner if required, and no separate holding elements need to be provided.

The carrier rail may furthermore comprise a connection axis for mechanically and preferably rotatably coupling the electrical or electronic component to the carrier profile and/or to the busbar and/or to the adapter element, preferably to the adapter housing. Preferably, the coupling region may be connectable to or itself comprise the connection axis. By providing a corresponding connection axis, the degrees of freedom of a corresponding electrical or electronic component can be further increased if required. This may be of considerable advantage, for example, when using lamps, in particular spot lamps, cameras, and other components, which preferably require a defined orientation, which is also preferably to be provided in a changeable manner.

The adapter element, and preferably its adapter housing, can be mechanically couplable/coupled to the carrier profile and/or to the busbar. In this respect, it is possible to also position the adapter element in a defined manner and to preferably provide it positioned. This should also make it possible to maintain a defined position, for example if the connections are used; that is, e.g., corresponding plugs as second connections are inserted into or removed from the corresponding connection sockets as first connections.

The adapter housing may preferably comprise a coupling structure, which is mechanically couplable or coupled to a corresponding coupling structure of the carrier profile and/or the busbar, preferably the holding structure of the carrier profile, and is preferably mechanically couplable or coupled displaceably in the longitudinal direction of the carrier rail. Consequently, it is possible to use existing holding structures of the carrier profile in order to provide the adapter housing securely on the carrier profile. In this way, additional connecting elements can also be saved.

The adapter housing can have a U-shape or a C-shape in order to at least partially encompass the carrier profile, in which the two side legs of the U-shape or C-shape preferably laterally abut against the carrier profile. The connecting leg, which connects the side legs, can then, for example, encompass the rear side of the carrier profile, which is opposite a light output side of the carrier rail, for example. Encompassing preferably takes place in particular when the adapter element is mechanically coupled to the carrier profile. In this way, it is possible to provide a secure and effective connection between the carrier profile and the adapter element without impeding a functional area of the carrier rail, for example a light output area.

The adapter housing may furthermore comprise a guide rail that is mechanically couplable/coupled to the electrical or electronic component in order to hold the electrical or electronic component displaceably along the guide rail. The mechanical coupling preferably occurs via the coupling region or the connection axis. In this way, the degrees of freedom of the electrical or electronic components can be further increased in that they are movable along the adapter housing and thus displaceable to a defined position.

The carrier rail may furthermore comprise at least one electrical or electronic component, which is electrically coupled/couplable to the busbar, preferably the electrical conductors thereof, and is preferably mechanically coupled/couplable to the carrier profile, for example. Preferably, the electrical or electronic component may be a lamp, in particular a light band lamp or a spot lamp, an operating device, and/or a sensor, in particular a motion sensor or a brightness sensor. In principle, the invention is not limited to a particular electrical or electronic component, provided that the latter can be coupled correspondingly to the carrier rail or the carrier profile/busbar thereof in order to be correspondingly provided functionally via the latter.

The carrier rail can furthermore comprise a cable guide element, which comprises at least one receiving portion for laterally inserting a cable transversely to a longitudinal extension and holding the cable. The cable guide element can furthermore comprise a connection structure for mechanically connecting the cable guide element to a corresponding connection structure, preferably the holding structure, of the carrier profile; or for example also to another corresponding connection structure, for example of the adapter element. By means of the cable guide element, secure holding/guiding and visually appealing stowing of cables is made possible.

According to a further aspect, the present invention furthermore relates to a carrier rail system for connecting electrical or electronic components, comprising a plurality of carrier rails, wherein at least one of the carrier rails is a carrier rail according to the present invention. The carrier rails are preferably arranged along one another in series. Preferably, the busbars of adjacent carrier rails, preferably the electrical conductors thereof, are electrically coupled to one another. It is thus possible to form a carrier rail system using a plurality of carrier profiles, wherein the carrier rail system can consist of carrier rails according to the invention or can at least be integrated into a corresponding carrier rail system.

The carrier rail system can furthermore comprise a first connection for electrically and preferably also mechanically coupling the busbars. The carrier rail system can also comprise a second connection for mechanically coupling the carrier profiles, preferably by corresponding coupling structure regions. The carrier rail system can furthermore preferably comprise a connecting part, such as a connecting rail, which preferably comprises at least a part of the first connection and/or of the second connection. In this respect, particularly simple connecting elements for electrical and/or mechanical coupling of a plurality of carrier rails can preferably be provided.

BRIEF DESCRIPTION OF THE DRAWINGS

Further features and advantages of the present invention are described on the basis of the figures of the accompanying drawings. The figures show.

DETAILED DESCRIPTION

FIGS. 1 to 6 in particular show different embodiments of a carrier rail 1 according to the invention for a carrier rail system. The carrier rail 1 comprises an elongate carrier profile 2. The carrier profile 2 can limit an internal space 20 for at least partially receiving electrical or electronic components 3. As shown here, the carrier profile 2 can have a substantially U-shaped cross-section, for example. This results from a connecting element 22 on the rear side here as well as two side legs 23, which extend away therefrom and are parallel here. At their end facing away from the connecting element 22, the side legs 23 define a through-opening or open longitudinal side 24, via which the electrical or electronic components 3 can be inserted at least partially.

The carrier profile 2 can furthermore comprise a holding structure 21 for the mechanical fastening of the carrier rail 1. In the exemplary embodiment shown here, the holding structure 21 extends outward on the rear side of the connecting element so that the (lamp) carrier rail 1 can be fastened to a side of the carrier profile 2 facing away from the through-opening 24, which receives the electrical or electronic components 3, and thus outside of a light output area, for example. The holding structure 21 has a substantially T-shaped cross-sectional shape here, other shapes naturally being conceivable. The carrier profile 2 can thus be mounted in a simple manner, for example by direct assembly or by means of an additional component, such as a retaining spring 200 (cf. FIG. 7), on a mounting surface, such as a wall or a ceiling. In the present case, the holding structure 21 is hollow and thus delimits a portion of the internal space 20.

The carrier rail 1 furthermore comprises at least one busbar 4 having at least one electrical conductor 40 for electrically connecting (the) electrical or electronic components 3. The busbar 4 extends along the carrier profile 2. The busbar is preferably received in or on the carrier profile 2, and particularly preferably in the internal space 20 of the carrier profile 2. In the exemplary embodiment of FIG. 10, the busbar 4 is provided here in the holding structure 21, i.e., in the portion of the internal space 20 delimited by the holding structure 21. The busbar 4 can also preferably be provided in another position in the internal space 20, for example on one or both side legs 23 and/or the connecting element 22. A plurality of busbars 4 may also be provided. By providing the busbar(s) 4 correspondingly, the electrical or electronic components 3 can be electrically coupled correspondingly to (at least one) of the busbar(s) 4, for example, by partially inserting said components into the internal space 20. The components 3 can furthermore preferably be mechanically coupled to the carrier profile 2 via the through-opening 24. For this purpose, the carrier profile 2 or the side legs 23 can have corresponding (elongate) structure regions.

Figure 1:
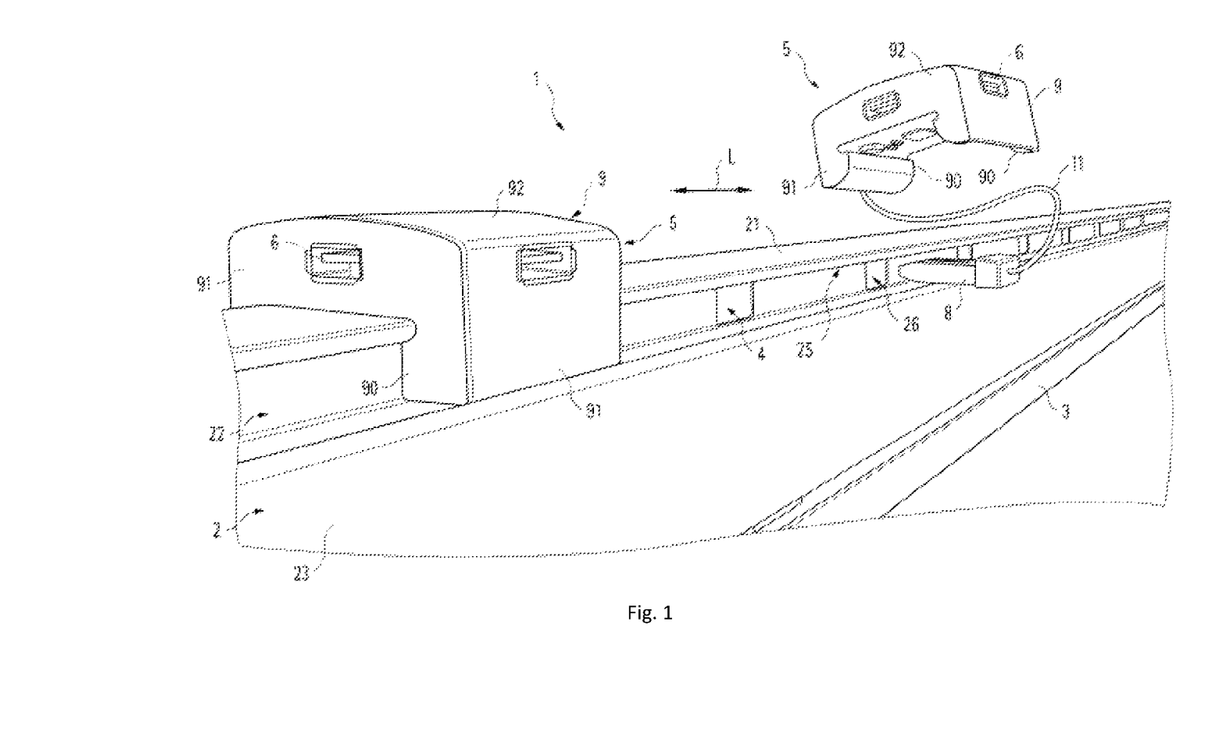
FIG. 1 is a perspective partial view of a carrier rail according to a first exemplary embodiment of the present invention.
Figure 2:
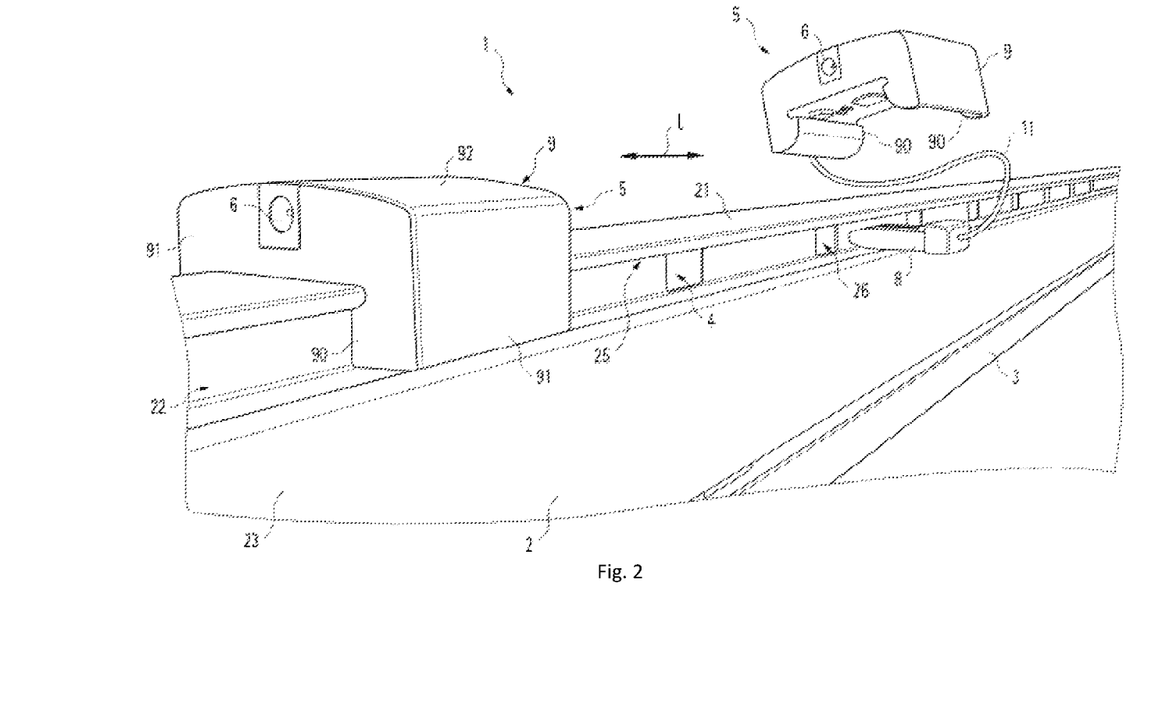
FIG. 2 is a perspective partial view of a carrier rail according to the invention according to a second exemplary embodiment of the present invention.

Furthermore, the carrier rail 1 comprises an adapter element 5. The adapter element 5 in turn comprises one (cf. FIG. 2-6) or a plurality of (cf. FIG. 1) first connections 6. The first connection 6 preferably forms a part of a standard interface, such as HDMI, USB, coaxial connector, network plug connector for a LAN cable for Power over Ethernet (PoE), for example, and the like. The first connection 6 preferably forms a standardized connection socket of such a standard interface. For example, FIG. 1 shows two USB connection sockets 6 each. By way of example, FIG. 2 shows a coaxial connector for each adapter element 5. The adapter element 5 can thus comprise a plurality of first connections 6, which are designed the same or differently. For example, as shown in FIG. 1, a plurality of USB connectors may be provided. It is also conceivable to provide an adapter element 5, which provides different types of such first connections 6; for example, in addition to USB connectors, network plug connectors and for example also phone jacks or any other form of corresponding first connections 6, preferably standardized connections, for connecting an electrical or electronic component 7 by means of a second connection 70 corresponding to the first connection 6.

Figure 10:
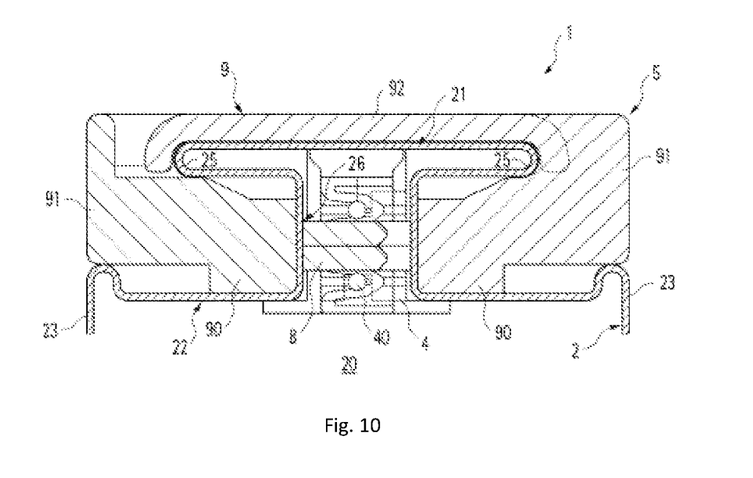
FIG. 10 is a perspective partial sectional view of a carrier rail according to the invention according to a fourth exemplary embodiment of the present invention.

The adapter element 5 furthermore comprises a connecting element 8, wherein the first connection 6 is couplable electrically and/or by means of signals to the busbar 4 via the connecting element 8, as shown by way of example in FIG. 10. As already mentioned, the first connection 6 is configured for connecting a corresponding second connection 70 of an electrical or electronic component 7. In this way, the electrical or electronic component 7 can be coupled electrically and/or by means of signals to the busbar 4 via the connecting element 8.

The adapter element 5 furthermore comprises an adapter housing 9 for carrying the first connection 6 and/or the connecting element 8. The adapter element 5 and preferably its adapter housing 9 are preferably mechanically couplable to the carrier profile 2 and/or to the busbar 4. For this purpose, the adapter housing 9 can have a coupling structure 90, as can be seen in FIGS. 1 to 6 and 10, for example. By means of this coupling structure 90, the adapter housing 9 can be mechanically couplable to a coupling structure 25, corresponding to the coupling structure 90, of the carrier profile 2 and/or of the busbar 4, preferably of the holding structure 21 of the carrier profile 2. The adapter housing 9 can preferably be mechanically couplable to the carrier profile 2 via the coupling structures 90, 25 in such a way that the adapter housing 9 is preferably displaceable along the longitudinal direction L of the elongate carrier profile 2. Measures can be provided to ultimately carry the adapter housing 9 securely positioned along the carrier profile 2; for example, by means of corresponding friction structures or by means of clamping or fastening elements.

As can in particular be seen in FIGS. 1 to 6 and 10, the adapter housing 9 can have a U-shape or C-shape in order to at least partially encompass the carrier profile 2. This preferably at least when the adapter element 5 is mechanically coupled to the carrier profile 2, as shown, for example, in FIGS. 1, 2, 5, 6, and 10. The U-shape or C-shape makes it possible for the adapter element 5 or its adapter housing 9 to preferably abut by means of the side legs 91 laterally against opposite sides of the carrier profile 2, here against the side legs 23, in order to enable secure positioning and, if necessary, longitudinally displaceable guidance of the adapter housing 9 in relation to the carrier profile 2. As shown in FIGS. 1 and 2, the connecting leg 92 on the rear side of the adapter housing 9 can comprise or provide the first connection(s) 6. In principle, the latter can naturally also be provided at other positions, for example of the adapter housing 9, or separately.

Figure 3:
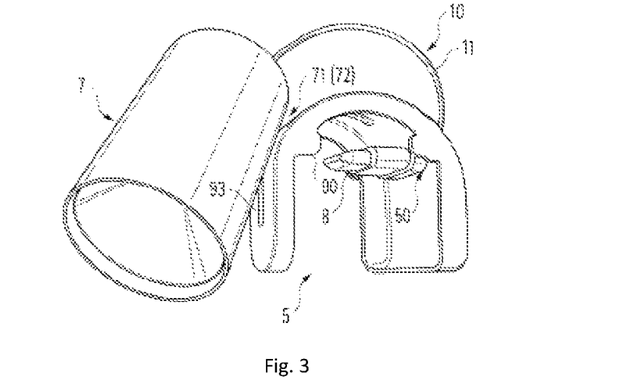
FIG. 3 is a perspective view of an adapter element according to the invention with an electrical/electronic component (spot lamp) according to an exemplary embodiment of the present invention.
Figure 4:
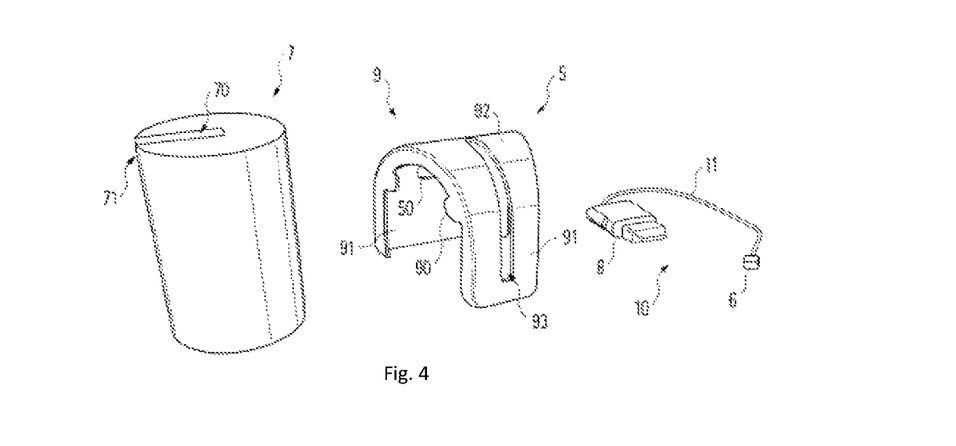
FIG. 4 is a perspective view of the elements shown in FIG. 3 in the disassembled state.
Figure 5:
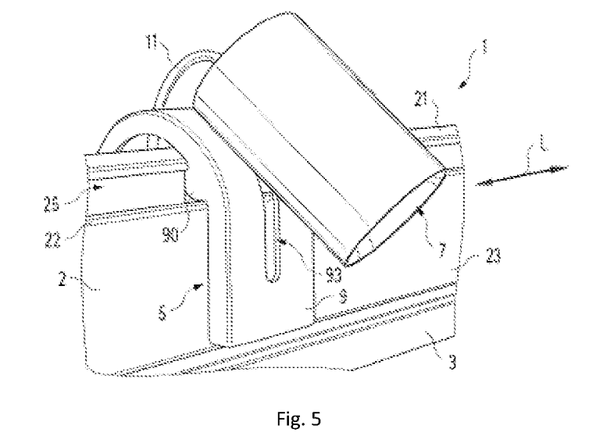
FIG. 5 is a perspective partial view of a carrier rail according to the invention according to a third exemplary embodiment of the present invention with the electrical/electronic component (spot lamp) connected.
Figure 6:
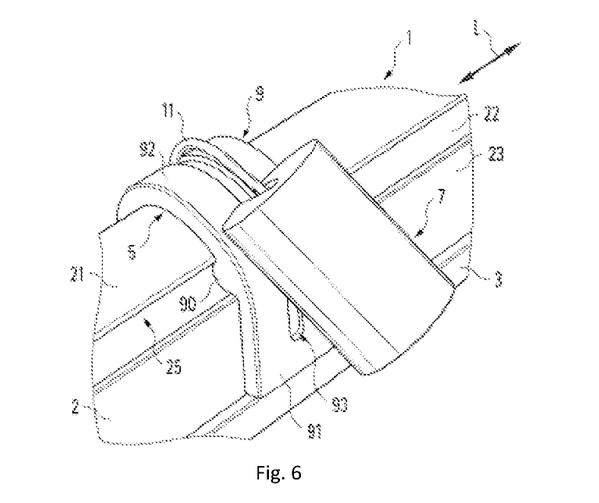
FIG. 6 is a further perspective partial view of the carrier rail according to FIG. 5.

As can be seen in FIGS. 3 and 4, it is, for example, conceivable that the connecting element 8 is designed as a unit 10 with the first connection 6. This unit 10 is then preferably connectable, and more preferably releasably connectable, to the adapter housing 9 via the connecting element 8, as can in particular be seen in FIG. 3.

The connecting element 8 can be connected electrically and/or by means of signals to the first connection 6 via a cable 11. This can be seen, for example, in FIGS. 1 and 2. In the exemplary embodiment of FIGS. 3 to 6, the connection of the connecting element 8 to the first connection 6 via the cable 11 forms the unit 10 described above. The connecting element 8 can also be formed directly on or with the adapter housing 9 as shown in FIG. 10. For example, the connecting element can project from the adapter housing 9 as a form extending inward here with respect to the U-shape or C-shape, and can have corresponding contacting elements, which then serve for coupling electrically and/or by means of signals to the busbar 4. By, for example, simply snapping the adapter housing 9 onto the carrier profile 2, a corresponding coupling of the connecting element 8 to the busbar 4 and thus of the first connection 6 via the connecting element 8 to the busbar 4 can thus be provided.

In principle, it is also conceivable that the connecting element 8 is releasably connected/connectable to the adapter housing 9, as can be seen, for example, from the exemplary embodiment of FIGS. 3 and 4. Here, the connecting element 8 can be inserted at least partially through the through-opening 50 through the adapter housing 9 and preferably also connected thereto in order to thus be provided for connecting to the busbar 4 or be brought into connection thereto.

The connecting element 8 can be connectable, preferably releasably, and further preferably directly, to the busbar 4 for coupling electrically and/or by means of signals. In this way, easy assembly and disassembly or reconfiguration of a carrier rail 1 according to the invention can be accomplished in a simple manner.

The carrier profile 2 can also comprise at least one through-opening 26. In the exemplary embodiment of FIGS. 1 and 2, a plurality of such through-openings 26 are provided and they are furthermore provided at regular intervals along the carrier profile 2 in the holding structure 21. In principle, these through-openings 26 can also be introduced in other areas of the carrier profile 2. The connecting element 8 is guided at least partially through the through-opening or one of the through-openings 26 for coupling electrically and/or by means of signals to the busbar 4, as indicated in FIGS. 1 and 2 at the respective rear adapter element 5 and shown in FIG. 10. In this respect, the through-openings 26 are preferably positioned and oriented in such a way that when passed through such a through-opening 26, a corresponding connecting element 8 can be automatically brought into coupling with the busbar 4 (cf. FIG. 10).

A printed circuit board for transforming the voltage values and/or current values of the busbar 4 to preferably those of the corresponding first connection 6 or the components 7 to be coupled thereto can be provided between the connecting element 8 and the first connection(s) 6. The printed circuit board may also be provided for a transformation from the first connection 6, for example an Ethernet input, to a third connection (not shown), for example an Ethernet output. In this case, the adapter element 5 preferably comprises the third connection.

Overall, the adapter housing 9 can preferably comprise the first connection(s) 6 or the third connection(s), as shown by way of example in FIGS. 1 and 2. By integrally providing the corresponding first and third connections (releasably if necessary), they can be securely positioned. In addition, a stable and easy connection of corresponding components 7 to these connections 6 is ensured.

It is in principle conceivable that each of the first connections 6, if a plurality is provided, can be coupled electrically and/or by means of signals to the busbar 4 via one or, if necessary, more connecting elements 8. It is also conceivable that several or all of the plurality of first connections 6 can be coupled electrically and/or by means of signals to the busbar 4 via one or more connecting elements 8. The composition and connection of first connections 6 to corresponding connecting elements 8 is not limited by the invention but rather can be designed in any way according to desired coupling profiles. For example, it is conceivable that different first connections 6 are to be coupled to different regions or conductors 40 of the busbar 4 so that a corresponding splitting into a plurality of connecting elements 8 can be advantageous. It is also conceivable that, for example, a particular connection 6 is to be coupled to a plurality of regions or conductors 40 of a busbar 4 in order to, for example, connect to different data strands so that a single first connection 6 can also have a plurality of connecting elements 8.

As can be seen in FIGS. 3 to 6, the carrier rail 1 can furthermore comprise an electrical or electronic component 7 that can be connected, preferably releasably connected, thereto. This in turn comprises a second connection 70 for connection to the corresponding first connection 6 of the adapter element 5 for coupling electrically and/or by means of signals to the busbar 4 via the connecting element 8. Preferably, as can be seen in FIGS. 3 to 6, the electrical or electronic component 7 can be a lamp, and in particular a spot lamp. It is also conceivable that the lamp is, for example, a gooseneck lamp, which comprises a corresponding part of a standard interface, for example a USB plug, and can thus be connected directly to the corresponding first connection 6. The components 7 can furthermore be sensors, such as motion sensors or brightness sensors, beacons, for example for use for indoor navigation, WLAN repeaters, speakers, cameras, fans, and/or fire detectors, or may also be or comprise other corresponding components 7, which are equipped with second inclusions 70 in order to be coupled to corresponding first connections 6. For example, these components 7 may comprise radio modules in order to be controlled via them or to transmit/receive data. However, control can also take place via a corresponding connection via connecting element 8 and busbar 4. The connection to the busbar 4, which occurs via the coupling of the first connection 6 and the second connection 70, is preferably used to supply power to the component 7. A corresponding printed circuit board can then preferably be provided, as previously described, in order to adapt the current values and voltage values of the busbar 4 to those of the corresponding component 7.

The electrical or electronic component 7 can furthermore comprise a coupling region 71 for mechanically coupling to the carrier profile 2 and/or to the busbar 4 and/or to the adapter element 5, and preferably to the adapter housing 9 thereof. This is shown by way of example in FIGS. 3 to 6. There, the spot lamp 7 shown here is mechanically coupled to the adapter housing 9. The carrier rail 1 and/or the electrical or electronic component 7 can furthermore comprise a connection axis 72 in order to mechanically couple the electrical or electronic component 7 to the carrier profile 2 and/or to the busbar 4 and/or to the adapter element 5, and preferably to the adapter housing 9 thereof. A mechanically rotatable coupling by means of the connection axis 72 is preferably preferred in order to correspondingly impart further degrees of freedom to the component 7. The coupling region 71 is preferably connectable to or, as shown, designed with or comprises the connection axis 72.

As in particular shown in FIGS. 3 to 6, the adapter housing 9 can furthermore comprise a guide rail 93 that can be mechanically coupled to the electrical or electronic component 7 in order to hold the electrical or electronic component 7 displaceably along the guide rail 93. Coupling with the guide rail 93 can preferably take place here via the coupling region 71 or the connection axis 72. As can be seen in the illustrated exemplary embodiment of FIGS. 3 to 6, this guide rail 93 can extend along the U-shape and C-shape of the adapter housing 9. Naturally, the guide rail 93 can be designed in any way in order to design the degrees of freedom of the component 7 individually as desired. In the exemplary embodiment shown here, the guide rail 93 extends predominantly on one side of the adapter element 5 or of the adapter housing 9 and thus also with respect to the carrier profile 2. In order to avoid tilting of the carrier rail 1, for example in a pendulum suspension, a corresponding counterweight can be provided on the component 7 on the side of the adapter housing 9 opposite the guide rail 93. For example, the counterweight may be provided releasably in order to select it according to the component 7 to be used. It is also conceivable that the guide rail 93 extends over the entire length of the adapter housing 9 and that the counterweight is then also connected to the guide rail 93 but on the side opposite the component 7. There are no limits to the design of the present invention.

Figure 9:
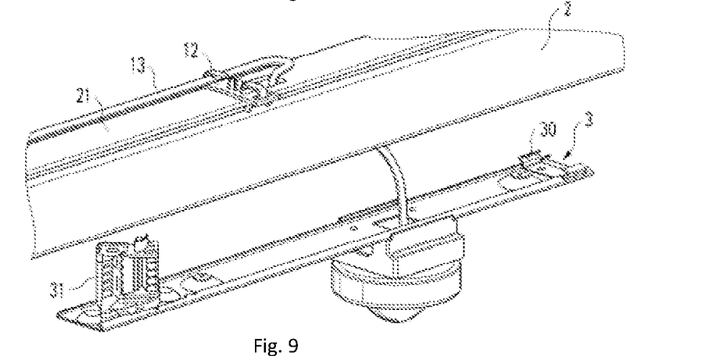
FIG. 9 is a further perspective partial view of the carrier profile according to FIG. 7, with electrical/electronic component (sensor, camera)

As indicated in FIGS. 1, 2, 5, and 6 and shown in FIG. 9, the carrier rail 1 can furthermore comprise an electrical or electronic component 3, which can be electrically coupled to the or another busbar 4 and preferably to the electrical conductors 40 thereof, and can preferably be mechanically coupled to the carrier profile 2, for example. A mechanical coupling, as can, for example, be seen in FIG. 9, can be provided by means of latching means 30 here in the form of a catch spring. Naturally, other connecting means are also conceivable here. Electrical contacting with (at least one) of the busbar(s) 4 can be provided via corresponding electrical contact elements 31, here in the form of a so-called rotary toggle. Naturally, other contact elements 31 are also conceivable. The electrical or electronic component 3 may preferably be a lamp, in particular a light band lamp or a spot lamp. FIGS. 1, 2, 5, and 6 show by way of example a light band lamp as the corresponding component 3. It is also conceivable that component 3 may comprise an operating device and/or a sensor, as indicated by way of example in FIG. 9. As sensors, all conceivable sensors, for example motion sensors or brightness sensors, come into consideration.

Figure 7:
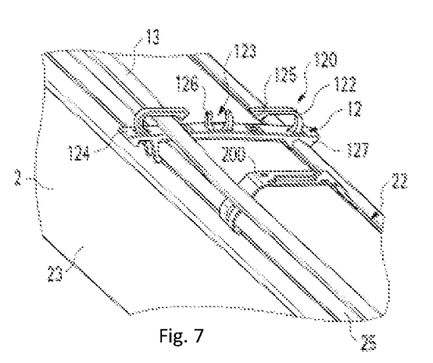
FIG. 7 is a perspective partial view of a carrier profile for a carrier rail according to the invention with a cable guide element.
Figure 8:
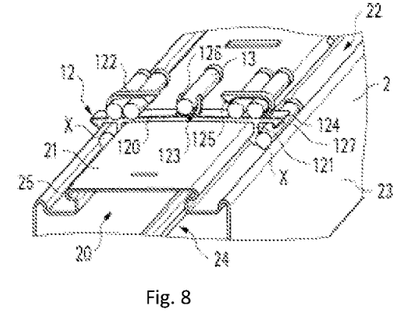
FIG. 8 is a further perspective partial view of the carrier rail according to FIG. 7.

The carrier rail 1 can furthermore comprise a cable guide element 12. Said guide element is to serve to securely guide and hold any external cables 13 of the carrier rail 1. For this purpose, the cable guide element 12 preferably comprises at least one receiving portion 120 for laterally inserting a cable 13 transversely to the longitudinal extension thereof and for holding the cable 13. Furthermore, the cable guide element 12 preferably comprises a connection structure 121 for mechanically connecting the cable guide element 2 to a corresponding connection structure of the carrier profile 2. The corresponding connection structure of the carrier profile 2 can preferably be the holding structure 21 as shown. In this respect, already existing structures can be used for fastening the cable guide element 12. The cable guide element 12 is then also located at a position at which a cable guide is particularly preferably desired since the latter is provided on the rear side of the carrier rail 1. The cable guide element 12 is preferably provided displaceably along the carrier profile 2; this is provided, for example, due to the longitudinally extending profile of the holding structure 21. The cable guide element 12 can thus be provided at any position and/or moved thereto.

The receiving portions 120 may be formed in a variety of ways, as shown. A spring tab 122 is conceivable, for example, in which one or more cables 13, for example, can be correspondingly inserted laterally and thus retained. Latching projections 125 on the spring tabs 122 may prevent the cables 13 from accidentally slipping out. Clamping tabs 123 are also conceivable, into which a cable 13 can be inserted laterally and latched; for this purpose, they can comprise catch projections or undercut regions 126 that are directed toward one another. It is also conceivable to provide retaining tabs 124, which, for example, allow lateral insertion of a cable between said retaining tab 124 and, for example, a part of the carrier profile 2 in order to ultimately hold and guide a cable 13 between these components. The latter may also comprise catch projections 127 to prevent the cables 13 held in this way from slipping out. The present invention thus sets no limits to the design of the cable guide element 12. The cable guide element 12 is preferably made of plastic, and more preferably in an injection molding process.

The cable guide element 12 is in particular of great advantage because the space available in the interior is usually very limited in carrier rails 1. Any additional cable strands that come from corresponding components 3 or components 7 are provided on the rear side of the carrier rail 1 and are thus largely invisible or covered by the carrier rail 1. An advantage can be that, for example, additional data lines laid on the rear side experience less interference from magnetic fields than they would be exposed to in the interior of a busbar.

By providing a plurality of carrier rails, at least one of which is a carrier rail 1 according to the invention, a carrier rail system for connecting electrical or electronic components 3 can be formed. The carrier rails 1 can preferably be arranged along one another in series. The busbars 4 of adjacent carrier rails 1, preferably their electrical conductors 40, can then be electrically coupled to one another. The carrier rail system may comprise a first connection for electrically and preferably also mechanically coupling the busbars 4. The carrier rail system can also comprise a second connection for mechanically coupling the carrier profiles 2, preferably through corresponding coupling structure regions of the carrier profile 2. The carrier rail system can also preferably comprise a connecting part, such as a connecting rail, which comprises at least a part of the first connection and/or of the second connection. Overall, a particularly simple coupling of several carrier rails 1 can thus take place. For example, the first connection may also be integrally formed with the busbar 4. A design in the form of a plug-socket connection, for example, is conceivable here. In a comparable manner, the second connection can also be designed integrally with the carrier profile 2, for example.

The present invention is not limited by the exemplary embodiments described above, provided it is covered by the subject matter of the following claims. The features of the different exemplary embodiments can in particular be combined in any way with one another and exchanged with one another.

The invention claimed is:

1. A carrier rail (1) for a carrier rail system, comprising an elongate carrier profile (2),
    a busbar (4) having at least one electrical conductor (40) for electrically connecting electrical or electronic components (3), the busbar (4) extending along the carrier profile (2), and
    an adapter element (5) having at least one first connection (6) and at least one connecting element (8) as well as an adapter housing (9) for carrying the first connection (6) and/or the connecting element (8),
    wherein the first connection (6) is couplable electrically and/or by means of signals to the busbar (4) via the connecting element (8),
    wherein the first connection (6) is configured for connecting a corresponding second connection (70) of an electrical or electronic component (7) in order to electrically and/or by means of signals couple the electrical or electronic component (7) to the busbar (4) via the connecting element (8); and
    the carrier rail further comprises at least one electrical or electronic component (3), which can be coupled electrically to the electrical conductors (40) of the busbar (4), and mechanically to the carrier profile (2), wherein the electrical or electronic component (3) is a light band lamp, a spot lamp, an operating device, a motion sensor and/or a brightness sensor.

2. The carrier rail (1) according to claim 1, wherein the first connection (6) forms part of a standard interface.

3. The carrier rail (1) according to claim 1, wherein the adapter element (5) comprises a plurality of first connections (6) that can be coupled electrically and/or by means of signals to the busbar (4) via one or more connecting elements (8).

4. The carrier rail (1) according to claim 1, wherein a printed circuit board can be provided between the connecting element (8) and the first connection (6) for a transformation of the voltage values and/or current values of the busbar (4), and/or for a transformation from the first connection (6) comprising an Ethernet input, to a third connection comprising an Ethernet output, wherein the adapter element (5) comprises the third connection.

5. The carrier rail (1) according to claim 1, wherein the adapter housing (9) comprises the first connection (6) and a third connection integrally formed with the adapter element (5).

6. The carrier rail (1) according to claim 1, wherein the carrier profile (2) comprises at least one through-opening (26), wherein the connecting element (8) is guided at least partially through the through-opening (26) for coupling electrically and/or by means of signals to the busbar (4).

7. The carrier rail (1) according to claim 1, wherein the connecting element (8) is releasably connectable to the busbar (4) for coupling electrically or by means of signals.

8. The carrier rail (1) according to claim 1, wherein the connecting element (8) is formed directly on or with the adapter housing (9), and/or wherein the connecting element (8) is releasably connected to the adapter housing (9).

9. The carrier rail (1) according to claim 1, wherein the connecting element (8) is connected electrically and/or by means of signals to the first connection (6) via a cable (11).

10. The carrier rail (1) according to claim 1, wherein the carrier profile (2) delimits an internal space (20) for at least partially receiving electrical or electronic components (3).

11. The carrier rail (1) according to claim 1, wherein the carrier profile (2) comprises a holding structure (21) for mechanically fastening the carrier rail (1).

12. The carrier rail (1) according to claim 1, wherein the busbar (4) is received in or on the carrier profile (2) in an internal space (20) of the carrier profile (2).

13. The carrier rail (1) according to claim 1, wherein the carrier profile (2) has an open longitudinal side (24), via which the electrical or electronic components (3) can be coupled electrically to the busbar (4) and p mechanically to the carrier profile (2).

14. The carrier rail (1) according to claim 1,
wherein the electrical or electronic component (7) comprises one of a spot lamp, a gooseneck lamp, a motion sensor, a brightness sensor, a beacon, a WLAN repeater, a speaker, a camera, a fan, or a fire detector.

15. The carrier rail (1) according to claim 1, wherein the adapter element (5) can be mechanically coupled to the carrier profile (2) and/or to the busbar (4).

16. The carrier rail (1) according to claim 15, wherein the adapter housing (9) comprises a coupling structure (90), which is mechanically couplable to a corresponding coupling structure of the carrier profile (2) and/or the busbar (4), displaceably in the longitudinal direction (L) of the carrier rail (1).

17. The carrier rail (1) according to claim 1, wherein the adapter housing (9) has a U-shape or a C-shape in order to at least partially encompass the carrier profile (2), when the adapter element (5) is mechanically coupled to the carrier profile (2).

18. The carrier rail (1) according to claim 1, wherein the adapter housing (9) comprises a guide rail (93), which is mechanically couplable to the electrical or electronic component (7), via the coupling region (71) or a connection axis (72), in order to hold the electrical or electronic component (7) displaceably along the guide rail (93).

19. The carrier rail (1) according to claim 1, furthermore comprising a cable guide element (12) comprising at least one receiving portions (120) for laterally inserting a cable (13) transversely to its longitudinal extension and holding the cable (13), as well as a connection structure (121) for mechanically connecting the cable guide element (12) to a corresponding connection structure of the carrier profile (2).

20. A carrier rail system for connecting electrical or electronic components (3), comprising a plurality of carrier rails, wherein at least one of the carrier rails is a carrier rail (1) according to claim 1, wherein the carrier rails (1) are arranged along one another in series, wherein the busbars (4) of adjacent carrier rails (1) are electrically coupled to one another.

21. A carrier rail system according to claim 20, furthermore comprising a first connection for electrically and preferably also mechanically coupling the busbars (4) and/or a second connection for mechanically coupling the carrier profiles (2), by corresponding coupling structure regions,
wherein the carrier rail system comprises a connecting rail comprising at least a part of the first connection and/or of the second connection.

22. A carrier rail (1) for a carrier rail system, comprising:
an elongate carrier profile (2);
a busbar (4) having at least one electrical conductor (40) for electrically connecting electrical or electronic components (3), the busbar (4) extending along the carrier profile (2); and
an adapter element (5) having at least one first connection (6) and at least one connecting element (8) as well as an adapter housing (9) for carrying the first connection (6) and/or the connecting element (8);
wherein the first connection (6) is couplable electrically and/or by means of signals to the busbar (4) via the connecting element (8);
wherein the first connection (6) is configured for connecting a corresponding second connection (70) of an electrical or electronic component (7) in order to electrically and/or by means of signals couple the electrical or electronic component (7) to the busbar (4) via the connecting element (8);
wherein the electrical or electronic component (7) comprises one of a spot lamp, a gooseneck lamp, a motion sensor, a brightness sensor, a beacon, a WLAN repeater, a speaker, a camera, a fan, or a fire detector; and
wherein the electrical or electronic component (7) comprises a coupling region (71) for mechanically coupling to the carrier profile (2) and/or to the busbar (4) and/or to the adapter element (5), to the adapter housing (9).

23. A carrier rail (1) for a carrier rail system, comprising:
an elongate carrier profile (2);
a busbar (4) having at least one electrical conductor (40) for electrically connecting electrical or electronic components (3), the busbar (4) extending along the carrier profile (2); and
an adapter element (5) having at least one first connection (6) and at least one connecting element (8) as well as an adapter housing (9) for carrying the first connection (6) and/or the connecting element (8);
wherein the first connection (6) is couplable electrically and/or by means of signals to the busbar (4) via the connecting element (8);
wherein the first connection (6) is configured for connecting a corresponding second connection (70) of an electrical or electronic component (7) in order to electrically and/or by means of signals couple the electrical or electronic component (7) to the busbar (4) via the connecting element (8);

wherein the carrier rail (1) further comprises a connection axis (72) for mechanically and rotatably coupling the electrical or electronic component (7) to the carrier profile (2) and/or to the busbar (4) and/or to the adapter element (5), to the adapter housing (9), wherein the coupling region (71) is connectable to or comprises the connection axis (72).

\* \* \* \* \*